United States Patent [19]

Kelleher

[11] 4,385,374
[45] May 24, 1983

[54] VIDEO DISC PLAYER WITH RFI REDUCTION CIRCUIT INCLUDING AN AGC AMPLIFIER AND DUAL FUNCTION PEAK DETECTOR

[75] Inventor: Kevin C. Kelleher, Plainfield, Ind.

[73] Assignee: RCA Corporation, New York, N.Y.

[21] Appl. No.: 210,975

[22] Filed: Nov. 21, 1980

[51] Int. Cl.³ .............................................. H04N 5/80
[52] U.S. Cl. .................................. 369/126; 358/336; 455/303
[58] Field of Search ................. 358/127, 128.5, 128.6, 358/314, 315, 336; 369/53, 124, 126, 128, 175; 330/252; 455/303, 296; 375/102, 104; 360/38

[56] References Cited

U.S. PATENT DOCUMENTS

| | | | |
|---|---|---|---|
| 3,989,893 | 11/1976 | Eisema | 358/336 |
| 4,017,677 | 4/1977 | Baker | 358/127 |
| 4,017,895 | 4/1977 | Oprandi et al. | 358/127 |
| 4,158,855 | 6/1979 | Thomas et al. | 358/127 |
| 4,189,679 | 2/1980 | Amazawa et al. | 455/303 X |
| 4,203,134 | 5/1980 | Christopher et al. | 358/336 X |
| 4,272,786 | 6/1981 | Gibson | 358/128.5 |
| 4,286,290 | 8/1981 | Pyles et al. | 358/128.5 |
| 4,327,431 | 4/1982 | Dieterich et al. | 358/128.5 |
| 4,327,432 | 4/1982 | Lang et al. | 369/126 |
| 4,361,881 | 11/1982 | Gibson | 369/126 |
| 4,364,119 | 12/1982 | Clemens | 369/126 |

Primary Examiner—Stuart N. Hecker
Assistant Examiner—Donald McElheny, Jr.
Attorney, Agent, or Firm—E. M. Whitacre; J. S. Tripoli; W. H. Meise

[57] ABSTRACT

Under certain conditions a video disc player can be responsive to externally applied interference signals to provide a defect in the display of the information recovered from the disc. Apparatus is provided to reduce the influence of the extraneous signal to the playback display. The apparatus includes an automatic gain controlled amplifier and a level detector which provides two output signals. One of the output signals is used to control the amplifier gain. When the other output signal reaches a certain level it is used to develop a signal which initiates corrective action in the player.

8 Claims, 2 Drawing Figures

VIDEO DISC PLAYER WITH RFI REDUCTION CIRCUIT INCLUDING AN AGC AMPLIFIER AND DUAL FUNCTION PEAK DETECTOR

BACKGROUND OF THE INVENTION

The present invention relates generally to video disc players and more particularly to video disc players having radio frequency interference reduction apparatus.

In certain types of video disc players, such as, for example, capacitive pickup video disc players, the signal pickup circuitry includes an oscillator operating in conjunction with a tuned circuit and peak detector. An example of such pickup circuitry may be found in U.S. Pat. No. 4,080,625 issued to H. Kawamoto et al. on Mar. 21, 1978. The oscillator frequency in such systems is generally set at a value falling within the ISM (industrial, scientific, medical) allocation band, for example, 915 MHz. The power output of this oscillator at 915 MHz is usually low and does not generally represent a significant problem in terms of r.f. radiation outward. However, there are certain types of equipment which operate at high power levels in the ISM band, such as radars for example, and, if a number of conditions are met (such as frequency, power level, directivity and location, etc.) these outside sources of radiation can have an adverse effect on the playback operation of the video disc system.

This undesirable mode of operation appears to manifest itself in the following way. When an outside source is radiating at levels which are higher than those anticipated by the pickup circuit detector in normal player operation, the extraneous detected output signal is supplied to an FM detector which locks onto the extraneous signal. The extraneous signal is then demodulated and passed through the player signal processing circuits and displayed on the television receiver. If the extraneous signal is a pulse of short duration-say two microseconds, then the demodulated version may appear on the output television display as a short interval of black or white on a horizontal line. This results from the fact that in FM systems of the type under consideration detection of high carrier frequencies is decoded as tending toward "white" level signals and detection of low carrier frequencies is detected as tending toward "black" level signals. These short duration interference signals may be noticeable to the discerning eye.

When the external source is of greater duration, say 125 microseconds, the effect is much more noticeable in the output display. Since one television horizontal line in the NTSC format is about 63 microseconds long, a condition may arise wherein two lines of the display will be white or black. Now if the outside source is a periodic type source, then two lines of the display will show up incorrectly on a corresponding periodic basis. This is noticeable even more than the previously mentioned situation.

There are various combinations of outside source power levels and durations which may produce other undesirable results in the final display such as a combination of light and dark spots on one or more horizontal lines of the display and even picture rolling if the FM demodulator falsely locks on to an extraneous signal when the vertical synchronization signal should normally be detected. In respect of all of the above identified display problems, it is desirable to provide a means to at least reduce the effects of the interference to a level which most observers would not even notice. Again, it should be noted that the problems mentioned arise only under a certain set of conditions.

In a patent application filed on Nov. 7, 1980 in the names of F. B. Lang and J. K. Clemens, now U.S. Pat. No. 4,327,432 a solution to the above situation is presented.

The Lang et al. invention provides a means for reducing the effects of outside ratio frequency interference (RFI) in the operation of a video disc player of the type which includes a pickup circit means coupled to an FM demodulator. The FM demodulator passes the FM detected signal to a defect compensation means which includes a defect switch and a delay line. The FM demodulator is also coupled to a defect detector which senses normal defects, that is, when the FM carrier deviation is beyond certain deviation limits. The normal operation of the defect compensation means is to recirculate and reprocess a previous line of demodulated information when the defect detector operates the defect switch. In accordance with the Lang et al. invention, a radio frequency interference reduction circuit is connected between the output of the pickup circuit means and the defect switch. The RFI reduction circuit, in one embodiment, comprises an amplifier, coupled to a detector, which in turn is connected to two conduction paths. The two conduction paths are connected to a differential signal comparator circuit. One of the two paths is a wideband path and the other path includes a low pass filter which does not pass abrupt changes in the signal provided at the output of the pickup circuit. Either one of the paths may have a d.c. offset voltage applied thereto. The net effect is that the differential input to the comparator provides an output in response to rapid amplitude variations in the output signal of the pickup circuit. When such a situation is detected, the comparator provides a signal to the defect switch, through an OR function circuit, to cause recirculation of a previously detected line of information for the duration of the detected defect. The OR circuit is used so that the recirculation may be accomplished for either the abnormal carrier deviations caused by the disc defects or the abnormal occurrence of a detected extraneous outside signal.

Another patent application was filed on Nov. 7, 1980 in the names of C. B. Dieterich and F. B. Lang, now U.S. Pat. No. 4,327,431 wherein a system of the Lang et al. type was presented with the addition of a variable offset voltage in one of the two paths.

In a patent application filed for J. K. Clemens Ser. No. 208,984, filed Nov. 21, 1980, now U.S. Pat. No. 4,361,881, an approach is taken wherein the signal from the pickup means is subtractively combined with a limited version of the same signal to enhance the ability to detect the extraneous signal. In still another patent application filed in the name of J. J. Gibson Ser. No. 208,982 filed Nov. 21, 1980, now U.S. Pat. No. 4,364,119, the signal from the pickup means is multiplied with the signal from the limiter as another approach to detection.

SUMMARY OF THE INVENTION

The present invention takes an approach which is different from all of the above approaches. The primary focus of the present invention is on strong or high amplitude extraneous pulse type signals which might capture the FM demodulator of the video disc player. In a player of the type previously described the present invention utilizes an AGC amplifier responsive to the signal provided from the pickup apparatus. The output signals from the amplifier are applied to a peak detector circuit. The peak detector circuit is arranged to have a long term average response and, at the same time, a short term peak level response. The long term response is used to control the gain of the AGC amplifier and the short term response is used to control a threshold device which when activated provides a control signal. The control signal which is, in essence, generated as a result of the presence of the extraneous signal at a certain amplitude level can be used to operate the normal defect compensation apparatus present in the player.

BRIEF DESCRIPTION OF THE DRAWINGS

A detailed description of a preferred embodiment of the present invention is shown in the drawing in which.

DESCRIPTION OF THE PREFERRED EMBODIMENT

Figure 1:
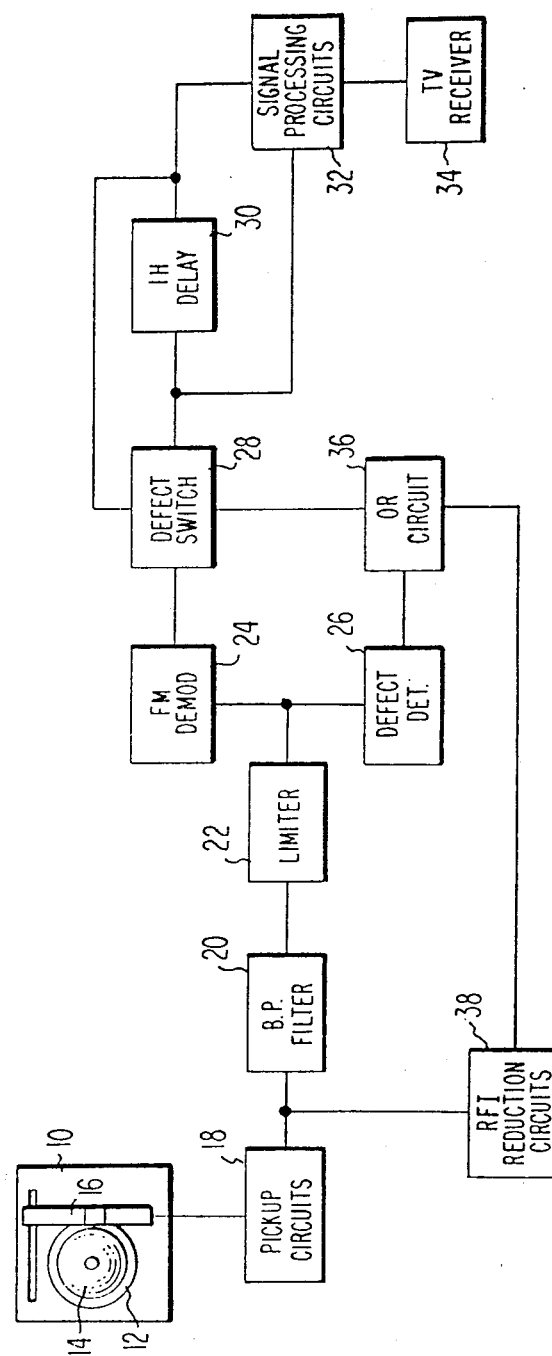
FIG. 1 is a block diagram representative of a video disc player including an RFI reduction circuit.

In FIG. 1, a video disc player 10 is shown including a turntable 12 for supporting a video disc record 14 of the capacitance type. The player 10 also includes a carriage 16 which carries a pickup cartridge therein. Typically, the carriage moves in a timed relation to the speed of rotation of turntable 12 during playback.

Electrically coupled to the cartridge in the carriage 16 are the pickup circuits 18 of the general type described in the Kawamoto patent. Although shown as a box separated from the carriage 16, these circuits are preferably housed in the carriage. As described in Kawamoto, the output signal from pickup circuitry 18 is a frequency modulated signal. This signal is bandpass filtered at 20. The signal at the output of filter 20 corresponds to the video information recorded on the disc. The video is recorded on a 5 MHz carrier with the black level causing zero deviation, sync tips at 4.3 MHz and peak white at 6.3 MHz. The FM audio carrier is at 716 KHz with a deviation of plus and minus 50 KHz. For purposes of discussing the present invention, only the video signal path will be considered and thus the bandpass filter 20 only passes the video frequencies of interest. The video signal is limited in limiter 22 to provide an appropriate signal to the FM demodulator 24 and defect detector 26.

FM demodulator 24 is a phase-locked-loop type and defect detector 26 is a latching comparator type. Both of these devices are of the type disclosed in U.S. Pat. No. 4,203,134 issued to T. J. Christopher et al. on May 13, 1980. The Christopher et al. patent also described the function and operation of the defect switch 28, the 1H delay line 30 and the signal processing circuits 32 for providing a signal for display on the TV receiver 34. For an even more detailed description and explanation of the function and operation of elements 30 and 32 reference should be made to U.S. Pat. No. 4,195,309 issued to T. J. Christopher et al. on Mar. 25, 1980.

In general terms, the circuit of FIG. 1 thus far described performs as follows. The pickup circuits 18 provide a frequency modulated signal which is filtered at 20 to develop the video FM signal which is then limited at 22. In the FM demodulator 24, the phase of the recovered signal is compared to that of a voltage controlled oscillator (VCO) to develop a signal which when low pass filtered provides a demodulated version of the video information. The defect detector 26 compares the recovered signal with the output of the VCO in the demodulator 24 and when the phase of the recovered signal is out of a certain range relative to the VCO signal, a defect indication pulse is generated and provided through circuitry which includes an OR function 36. As will be shown herein, the OR function is integral to the existing circuitry of the present invention and in actual practice only a circuit point is required to achieve the OR function. A defect signal coupled via the OR circuitry 36 is used to operate the defect switch 28. When operated, switch 28 causes information signals which were previously recovered to be re-used by passing signals coupled from the output of the 1H delay line 30. The recirculation or re-use of previously recovered information continues for as long as the switch 28 is held in the re-use position.

The arrangement of FIG. 1 further comprises a radio frequency interference reduction apparatus 38 which may comprise several circuit functions. RFI reduction apparatus 38 is electrically connected between the output terminal of the pickup circuits 18 and an input terminal of the OR circuit 36. Apparatus 38 could be connected to the output of filter 20 since the filtered signal includes the information used in the operation of the RFI reduction scheme. Apparatus 38 is used to detect anomalous signals from outside sources, as discussed above, and develop an appropriate signal which will activate the defect switch 28, via the OR circuit 36. By so doing, apparatus 38, in cooperation with the other elements mentioned, causes previously recovered information to be recirculated through switch 28 so that instead of seeing white or black lines appearing across the display, something more like that which should appear will be displayed. In most cases, the substitution of one line or less as described above cannot be noticed by the general observer. Even the substitution of the same line twice in a sequence, which is on the order of a 125 microsecond defect, is barely noticeable to most observers.

It will be recalled that the output signals from the defect detector 26 and the RFI reduction apparatus 38 are OR'ed at 36. It is desired to have the normal defect detection and substitution take place in the usual fashion so that out of band deviations due to signal defects are handled in the usual way. At the same time, when an outside signal gets picked up the system should see this and respond in an appropriate fashion.

Figure 2:
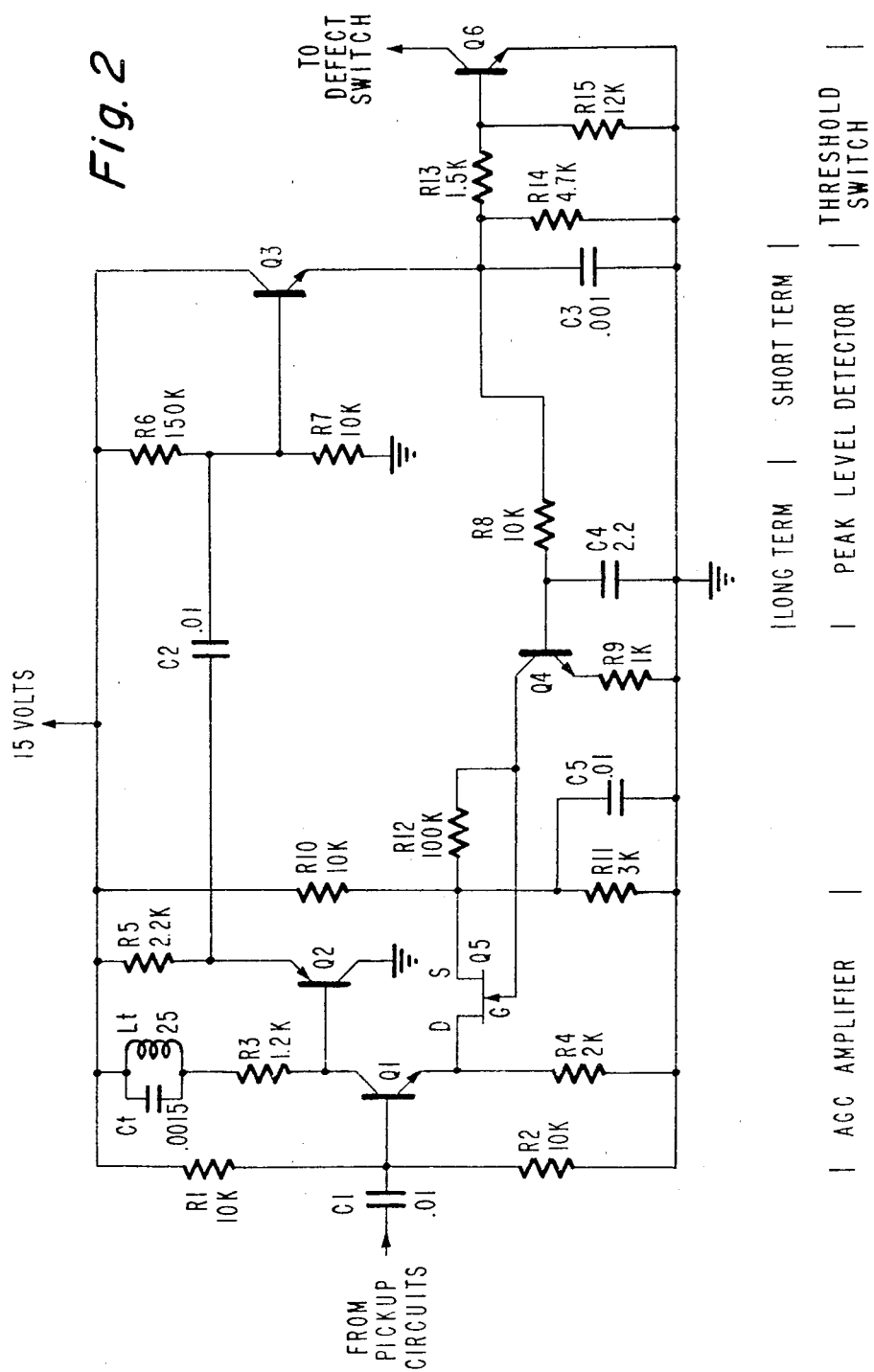
FIG. 2 is a schematic circuit diagram of the RFI reduction circuit in accordance with the present invention.

The circuit shown in FIG. 2 generally comprises an automatic gain controlled amplifier, a peak level detector having provision for detecting long term average levels and short term peak levels and a threshold switch which will respond primarily to the short term peaks resulting from the presence of the extraneous signal at a certain amplitude level above the long term average carrier level.

The signal at the output of the pickup ciruits 18 is supplied to the circuit via capacitor C1. This signal will be the normal FM modulated carrier which can vary due to a number of factors from 50 millivolts to 1.2 volts. Occasionally, an extraneous pulse signal may also be supplied to the circuit.

Transistor Q1 is the main amplifier element in the a.g.c. amplifier. The output form Q1 is buffered through transistor Q2 and a.c. coupled to the base of transistor Q3 in the peak level detector.

The signals appearing at the emitter electrode of Q3 are stored on the relatively large capacitor C4. That is, the time constant formed by C4 and R8 is relatively long. Thus capacitor C4 may be thought of as storing the long term average level of the detected signal.

This long term signal is applied to the FET transistor Q5 via transistor Q4. Transistor Q5 acts as a variable impedance device in the emitter circuit of transistor Q1. By controlling the impedance of transistor Q5 (drain to source) the gain of the a.g.c. amplifier is controlled.

Also coupled to the emitter electrode of peak detector Q3 is the threshold switching transistor Q6. This transistor is biased so as to turn on when the voltage level stored on capacitor C3 (short term) reaches a prescribed level. In this way a control signal is developed at the collector of transistor Q6 which may then be applied to the defect switch 28 to initiate signal substitution.

Since the control signal just mentioned is provided on an open collector of a transistor, it is not necessary, in this case to pass the control signal through an actual OR gate to the defect switch 28. In this case, the OR function can be accomplished by simply having the collector electrode of Q6 and the output terminal of the defect detector 26 connected to a common point which is electrically connected to the defect switch 28.

The operation of the circuit of FIG. 2 can be explained by way of an example. Assume that the signal from the pickup circuits increases slowly due to normal variations. An amplified signal is passed through Q1 and buffered through Q2. The input signal to the peak detector Q3 is long term averaged to about 0.7 volts peak to peak. The voltage level at the short term capacitor C3 will be about a 0.6 volts average. The slowly rising level is integrated over a relatively long time by R8 and C4 and the slow increase in voltage is provided to the gate electrode of Q5 which causes the drain to source impedance of Q5 to increase and the gain of the amplifier circuit goes down. In this way, the output of the a.g.c. amplifier tends to be smoothed out or stabilized against normally expected variations.

Now let us assume that a strong extraneous pulse near the player oscillator frequency comes into play. The beat frequencies become a problem because they can fall near the video carrier at 5 MHz or even the audio carrier at 716 KHz. The effect of the added extraneous pulse type signal is a sudden rise in the output signal of the amplifier. The elements in FIG. 2 are arranged to be responsive to a sudden, large increase in the amplifier output signal. Specifically, if the voltage level at the base of transistor Q3 goes from 0.7 volts to about 1.4 volts, then the voltage at the junction of the emitter electrode of Q3 and the short term capacitor C3 will suddenly rise. When this voltage rises to about 0.9 volts, the threshold switch Q6 is turned on and the control signal at the collector electrode of Q6 is generated.

In order to guard against the possibilty of beats coming in from the pickup circuits at frequencies near the audio carriers (716 KHz for mono and 716 KHz and 905 KHz for stereo), a tuned circuit comprising capacitor Ct and inductor Lt is placed in the collector circuit of transistor Q1. This tank circuit is tuned to about 800 KHz. Should a beat frequency of reasonable amplitude come through near the 800 KHz center frequency, the tank circuit will respond to raise the amplifier output voltage and if the base of transistor Q3 rises to the 1.4 volt level, then there will be an output control signal on the collector of transistor Q6.

In FIG. 2, all resistor values are in ohms, capacitor values are in microfarads and the inductance value of Lt is in microhenries.

What is claimed is:

1. The circuit comprising:

a gain controllable amplifier having an input terminal, an output terminal and a control terminal, said amplifier being responsive to a frequency-modulated input signal comprising a first component varying in amplitude and a second component which varies in amplitude faster than said first component, signal level detector means connected to the output terminal of said amplifier, said detector means providing first and second output signals, said first output signal corresponding to the average amplitude level of said signal at the output terinal of said amplifier and said second output signal corresponding to the amplitude level of said signal at the output terminal of said amplifier;

coupling means coupled to said signal level detector means and to said control terminal of said controllable amplifier for coupling said first output signal to the control terminal of said amplifier for controlling the gain of said amplifier and thereby tending to maintain constant the magnitude of said first output signal; and sensing means coupled to said signal level detector means and responsive to said second output signal for providing a circuit output signal when the amplitude of said second output signal exceeds the amplitude of said first output signal by a prescribed amount.

2. The circuit according to claim 1 wherein said detector means includes a first and second signal storage capacitor, said first capacitor having a much larger capacitance value than said second storage capacitor, said first output signal being related to the voltage stored on said first capacitor and said second output signal being related to the voltage stored on said second capacitor.

3. The circuit according to claim 2 wherein said amplifier comprises a transistor with a variable impedance device in the emitter circuit thereof and where said first output signal controls the impedance value of said variable impedance device.

4. The circuit according to claim 3 wherein said sensing means responsive to said second output signal comprises a threshold switching transistor having a base electrode coupled to said second capacitor and wherein said circuit output signal is provided at the collector electrode of said threshold switching transistor.

5. In a video disc player of the type having: pickup apparatus for recovering an information signal recorded on a disc in the form of a frequency-modulated carrier signal; demodulation apparatus; defect detection apparatus for detecting defects in the recovered signal; and defect compensation apparatus responsive to the operation of the defect detection apparatus for providing a substitute signal in place of the recovered signal in the playback display of said information signals during occurrences of defects in the recovered signal; said player being subject to interference with normal playback display operations due to the pickup of unrecorded, externally applied signals; apparatus for reducing the influence of said external signals comprising:

a gain controlled amplifier;

signal level detector means for providing a first output signal corresponding to the averaged detected amplitude level of said frequency-modulated carrier and of said externally applied signal and also providing a second output signal representing the instantaneous amplitude of the sum of said frequency-modulated carrier and said externally applied signal;

feedback means coupled to a control input terminal of said gain controlled amplifier and to said detector means for coupling said first output signal to said amplifier for controlling the gain of said amplifier whereby said first output signal tends to be maintained at a constant level;

output signal generating means coupled to said detector means and responsive to said second output signal for providing a circuit output signal when the amplitude of said second output signal exceeds the amplitude of said first output signal by a predetermined amount; and means for coupling said circuit output signal to said defect compensation apparatus.

6. The apparatus according to claim 5 wherein said detector means includes a first and second signal storage capacitors, said first capacitor having a substantially larger capacitance value than said second storage capacitor, said first output signal being related to the voltage stored on said first capacitor and said second output signal being related to the voltage stored on said second capacitor.

7. The apparatus according to claim 6 wherein said amplifier comprises a transistor with a variable impedance device in the emitter circuit thereof and where said first output signal controls the impedance value of said variable impedance device.

8. The circuit according to claim 7 wherein said output signal generating means responsive to said second output signal comprises a threshold switching transistor having a base electrode coupled to said second capacitor and wherein said circuit output signal is provided at the collector electrode of said threshold switching transistor.

* * * * *